INVENTORS
ROBERT H. HASS
NICHOLAS L. KAY

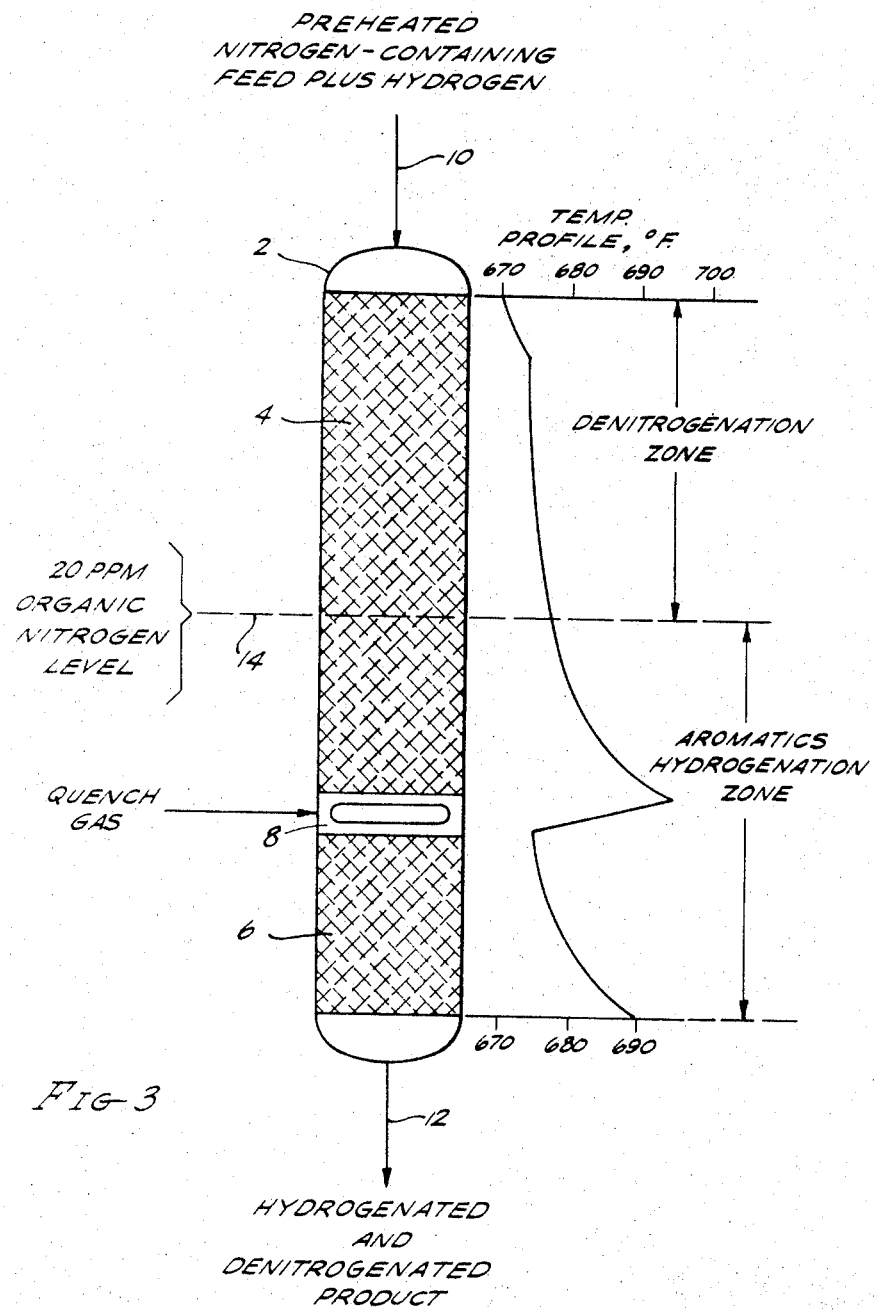

United States Patent Office 3,728,250
Patented Apr. 17, 1973

3,728,250
INTEGRAL HYDROFINING-HYDROGENATION PROCESS
Robert H. Hass and Nicholas L. Kay, Fullerton, Calif., assignors to Union Oil Company of California, Los Angeles, Calif.
Continuation-in-part of application Ser. No. 679,861, Nov. 1, 1967. This application July 2, 1970, Ser. No. 51,765
Int. Cl. C10g 23/00
U.S. Cl. 208—89       12 Claims

ABSTRACT OF THE DISCLOSURE

Aromatic mineral oil feedstock boiling below about 700° F. and also containing substantial amounts of organic nitrogen are first hydrofined over a catalyst comprising nickel plus molybdenum and/or tungsten to reduce the organic nitrogen content to below about 20 parts per million, and total effluent therefrom is then hydrogenated over the same type of catalyst at pressures above about 1,000 p.s.i.g. to effect a substantial saturation of aromatic hydrocarbons. The most significant novel feature of the invention lies in effecting hydrogenation of mono-aromatic hydrocarbons with the specified catalysts in the presence of both ammonia and hydrogen sulfide.

RELATED APPLICATIONS

This application is a continuation-in-part of application Ser. No. 679,861, filed Nov. 1, 1967, now abandoned.

BACKGROUND AND SUMMARY OF THE INVENTION

The hydrogenation of mono-aromatic hydrocarbons (i.e., hydrocarbons containing a benzene ring, but free of fused-ring polycyclic structures) is recognized in the art as requiring relatively high hydrogen pressures, and the use of highly active hydrogenation catalysts. Normally, the art has preferred to employ Group VIII noble metal catalysts. A major disadvantage in the use of such noble metal catalysts resides in the fact that their activity for hydrogenating aromatic hydrocarbons is substantially poisoned by sulfur and nitrogen compounds. Consequently, it has been considered necessary to remove substantially all nitrogen and sulfur compounds from feeds to be hydrogenated over such catalysts. Conventionally, the removal of sulfur and nitrogen compounds is effected by catalytic hydrofining employing well known "sulfactive" catalysts such as cobalt-molybdenum, or nickel-molybdenum supported on alumina carriers. These catalysts are highly effective for removing sulfur and nitrogen compounds, but have conventionally been regarded as substantially inactive for hydrogenating mono-aromatic hydrocarbons.

It has recently been shown (U.S. Pat. No. 3,228,993) that the nickel-molybdenum type hydrofining catalysts such as are employed herein do have a desirable activity for hydrogenating mono-armomatic hydrocarbons, provided that the hydrogenation is carried out in the absence of all nitrogen compounds, and if the catalyst is either in a prereduced or presulfided state. For the hydrogenation of nitrogen-containing feeds the said patent recommends that such weeds by first completely hydrofined to remove nitrogen, followed by cooling and condensing of the resulting product to permit removal of ammonia and hydrogen sulfide by washing, following which the washed product may then be hydrogenated over the reduced or presulfided nickel-molybdenum catalyst. The necessity for cooling, washing and reheating the product between the hydrofining and hydrogenation steps adds greatly to the expense of the overall operation. It would be highly desirable to carry out the hydrofining and aromatics hydrogenation operations simultaneously, or at least "integrally," in series, without intermediate separation and purification steps.

We have experimentally confirmed that it is indeed impossible, as supposed in said patent, to carry out the aromatics hydrogenation step simultaneously with the denitrogenation reaction, but most importantly we have discovered that the two reactions can be carried out consecutively in an "integral" fashion, without intervening separation of the hydrogen sulfide and ammonia formed during the hydrofining step. The organic nitrogen components of the feed do effectively poison the mono-aromatics hydrogenation activity of the catalyst, but we have found that there is a dramatic difference between the effect of organic nitrogen and of ammonia in this respect, and that substantial partial pressures of ammonia may be tolerated and still obtain effective hydrogenation of mono-aromatic hydrocarbons at pressures above about 1000 p.s.i.g. At pressures below 1000 p.s.i.g., hydrogenation rates appear to be very low.

The most critical aspect of the invention resides in insuring that the organic nitrogen content of the feed be reduced to less than about 20 p.p.m., and preferably less than about 5 p.p.m., and then contacted with sufficient additional catalyst to achieve the desired hydrogenation of mono-aromatics. The initial denitrogenation to reduce the feed nitrogen to less than 20 p.p.m. may be carried out at conventional pressures and temperatures, but thereafter, to effect mono-armoatics hydrogenation it has been found that pressures in excess of 1000 p.s.i.g., and preferably above 1500 p.s.i.g., are necessary in order to achieve effective hydrogenation at reasonable space velocities of, e.g., 1.0 or higher.

A further important consideration in our invention lies in suitably correlating hydrogenation temperatures and pressures so that the desired hydrogenation may be achieved over a substantial run length of, e.g., at least about 30 days. Due to thermodynamic considerations, at any given hydrogen partial pressure there is a limiting upper temperature at which dehydrogenation rates overtake hydrogenation rates. At low pressures this factor places severe limitations on permissible run lengths. Such runs are normally initiated at a relatively low temperature with fresh catalyst, and continued with periodic temperature increases to compensate for catalyst deactivation. If the span between the initial temperature and the terminal temperature (at which dehydrogenation rates become excessive) is less than about 20° F., undesirably short run lengths will result. By operating at the preferred pressure ranges above about 1500 p.s.i.g., it is found that operative spans of 40–200° F. are entirely feasible, thus providing for extremely long run lengths.

All of the foregoing considerations are aptly illustrated by the accompanying drawings, to which reference is now made.

$$12(P-1000) = T-710)^2$$

Figure 1:
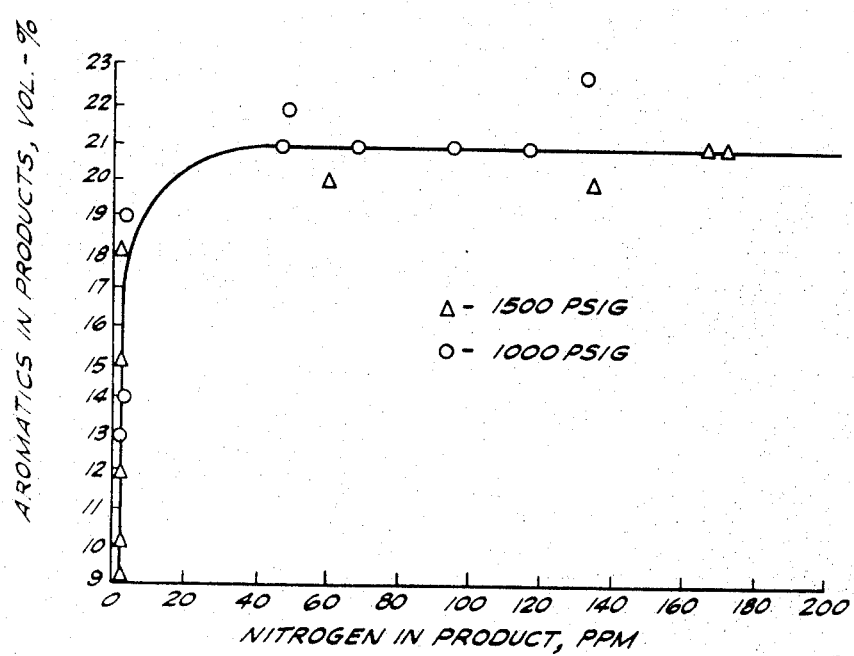
FIG. 1 is a plot and graph of various representative data points from Examples 1–3 herein, depicting the relationship between aromatics content and nitrogen content of the turbine fuel products produced therein. The initial feedstocks contained about 23–25 volume percent of aromatic hydrocarbons, and nitrogen contents in the range of about 110–1270 p.p.m. It will be noted that hydrogenation of aromatic hydrocarbons to completely non-aromatic species apparently does not proceed to any significant degree until the nitrogen content has been reduced to below about 20 parts per million. At all nitrogen contents above 20 p.p.m. there was little or no complete hydrogenation of aromatic hydrocarbons.

This parabola also illustrates graphically the decreasing operative temperature span associated with decreasing pressures, such that at 1000 p.s.i.g. the permissible run length would be very short, even to obtain minimal results. Hence, the preference for employing pressures above about 1500 p.s.i.g.

FIG. 3 illustrates diagrammatically a desirable mode of practicing the invention, and specifically of handling the unusual type of heat release which occurs in the commercial adiabatic practice of our process. A conventional type of reactor 2 is illustrated, containing an upper catalyst bed 4 and a lower bed 6, separated by a quench zone 8. Preheated feed plus hydrogen (illustratively at a temperature of 670° F.) is brought in the top of the reactor via line 10, and the denitrogenated and hydrogenated product is withdrawn via line 12. The upper portion of the temperature profile graph, down to about line 14, is typical of a conventional, adiabatic hydrofining reaction involving an initial fairly rapid temperature rise reflecting the hydrogenation of olefins and diolefins, followed by a much slower temperature increase reflecting typical hydrofining reactions of desulfurization and denitrogenation. When denitrogenation has proceeded to an extent such that only about 20 p.p.m. of organic nitrogen remain in the feed, the rate of hydrogenation of aromatic hydrocarbons then begins to increase geometrically, as illustrated by the lower portion of the temperature profile graph. In order to control this exothermic heat release and prevent a runaway hydrocracking reaction, cool quench gas such as hydrogen is injected into quench zone 8. One or more of such quench zones may be desirable, depending upon the aromatics content of the feed.

The unconventional aspect of this operation is that more cooling is ordinarily required in the lower half of the reactor than in the upper half; normally, in hydrogenation reactions the greatest heat release occurs in the upper half of the reactor. In most cases, no quench whatever is required in our process until the organic nitrogen content of the feed has been reduced to below about 20 parts per million.

DESCRIPTION OF CATALYSTS

In broad aspect, operative catalysts for use herein may comprise any desired combination of nickel sulfide plus a sulfide of molybdenum and/or tungsten, preferably supported on a refractory oxide carrier having a Cat-A cracking activity index below about 25. Suitable carriers include in general the difficultly reducible oxides such as alumina, silica, titania, zirconia, clays and the like. Preferred catalysts comprise the sulfided forms of nickel and molybdenum in amounts of about 1–5 weight-percent Ni and 4–25 percent Mo. Such catalysts are conventional in the art and hence need not be described in detail. They are normally prepared by impregnating the carrier with an aqueous solution or solutions of soluble salts of the respective metals, followed by draining, drying and calcining in air at temperatures up to about 800–1200° F. The calcined catalysts are preferably subjected to a presulfiding operation prior to contacting the feedstock, as by flowing a mixture of hydrogen and hydrogen sulfide through the catalyst bed at temperatures of e.g., 500–600° F.

The preferred carrier is activated alumina gel, preferably containing a minor proportion of coprecipitated silica gel. The silica content should not however exceed about 40% by weight; higher silica contents lead to undesirable cracking activity. The preferred silica content is between about 3 and 25 weight-percent. Prior to impregnation the carrier is preferably formed, as by extrusion or die-compression, into pellets of about $\frac{1}{32}''-\frac{1}{4}''$ diameter. In some cases the catalyst may be employed in a powdered form.

DESCRIPTION OF FEEDSTOCKS

The process of this invention is effective for the denitrogenation and hydrogenation of substantially any mineral oil feedstock containing organic nitrogen and aromatic hydrocarbons, which feedstocks boil mainly within the range of about 300° to 750° F. Preferred feedstocks contain at least about 10 weight-percent, and up to 100 weight-percent of aromatic hydrocarbons, and at least about 100 p.p.m. and up to about 2 weight-percent of organic nitrogen. The term "organic nitrogen" as employed herein is intended to refer to typical organic nitrogen found in mineral oils of petroleum, shale, or tar sands origin, at least about 25 percent, and normally at least 50 percent of which comprises heterocyclic, resonance-stabilized nitrogen found typically in basic compounds such as pyridine, quinoline and substituted homologs thereof. Only these types of organic nitrogen compounds appear to poison strongly the aromatic hydrogenation activity of the present catalysts; other nitrogen compounds such as alkyl amines, phenyl amines, phenylalkyl amines, naphthyl amines and the like are apparently converted so rapidly to ammonia that they exhibit little or no greater poisoning effect that does ammonia.

Typical preferred feedstocks for use in our process comprise heavy naphthas, straight run gas oils, light coker gas oils, catalytic cracking cycle oils, and the like. It is preferred that at least about 80% of the feed boil within the range of 350–650° F. with not more than about 20% thereof boiling above 650° F. Sulfur is normally present in amounts of about 0.01–3 weight-percent.

PROCESS CONDITIONS

The process may be carried out under conventional contacting conditions, involving passing the feedstock plus hydrogen downwardly, upwardly or countercurrently through a fixed bed of the granular catalyst. Contemplated operating conditions for the combined denitrogenation-hydrogenation sequence may be summarized as follows:

OPERATING CONDITIONS

| | Broad range | Preferred range |
| --- | --- | --- |
| Pressure, p.s.i.g. | 1,000–5,000 | 1,500–4,000 |
| Temperature, ° F.: | | |
|   Start of run | 550–750 | 625–675 |
|   End of run | 650–800 | 700–620 |
| LHSV, v./v | 0.5–10 | 0.75–5.0 |
| $H_2$/oil ratio, M s.c.f./B | 2–20 | 4–10 |

The above conditions, primarily temperature, are suitably adjusted to maintain the desired degree of hydrogenation of aromatic hydrocarbons per pass. In most cases it is desirable to hydrogenate at least about 20 mole-percent, and preferably at least about 30 mole-percent of the aromatic hydrocarbons to completely non-aromatic species. The aromatic hydrocarbons in the feedstocks employed herein are mainly mono-aromatics. Some diaromatics are usually present but substantially no triaromatics. It is important to observe that the catalysts and conditions employed herein effect hydrogenation not only of diaromatics, but of the monoaromatics.

It is known in the art that fused-ring polyaromatic compounds can be easily hydrogenated down to monoaromatics, but the last remaining benzene ring is very difficult to hydrogenate. It is often found in fact that in conventional catalytic hydrofining of feedstocks containing both monoaromatics and diaromatics, the product will contain more monoaromatics than the feed, due to conversion of diaromatics to monoaromatics which remain substantially unhydrogenated. In our process on the other hand, the monoaromatic content of the feedstock is normally reduced by at least about 30% and preferably at least about 50%. This necessarily means that, in feedstocks which also contain polyaromatic hydrocarbons, the total mole-concentration of aromatics will be reduced by at least about 30% and preferably at least 50%. This follows because the bulk of the polyaromatics will be converted to monoaromatics before any substantial hydrogenation of the monoaromatics has taken place, and then the aggregate of original and synthetic monoaromatics must be hydrogenated sufficiently to achieve the stated reduction in mole-concentration of original monoaromatics. The prior art hydrogenation of polyaromatics to monoaromatics with hydrofining type catalysts does not involve any significant reduction in the mole-concentration of aromatic hydrocarbons.

It is of primary economic concern to maintain a constant conversion to products of desired quality over an extended run length of at least about 30 days. To achieve this objective, the process is initiated at a relatively low temperature, and catalyst deactivation is compensated by periodically increasing the hydrogenation temperature. As noted above, this objective is difficult to achieve at pressures below about 1500 p.s.i.g., due to adverse thermodynamic effects at end-of-run temperatures. A specific objective of our process is hence to utilize pressures above about 1500 p.s.i.g., whereby a hydrogenated product of substantially constant quality may be obtained over a run length of at least about 30 days, and normally at least about 90 days, encompassing a total temperature increase of at least about 40° F. within the preferred operating range of about 625–720° F.

Figure 2:
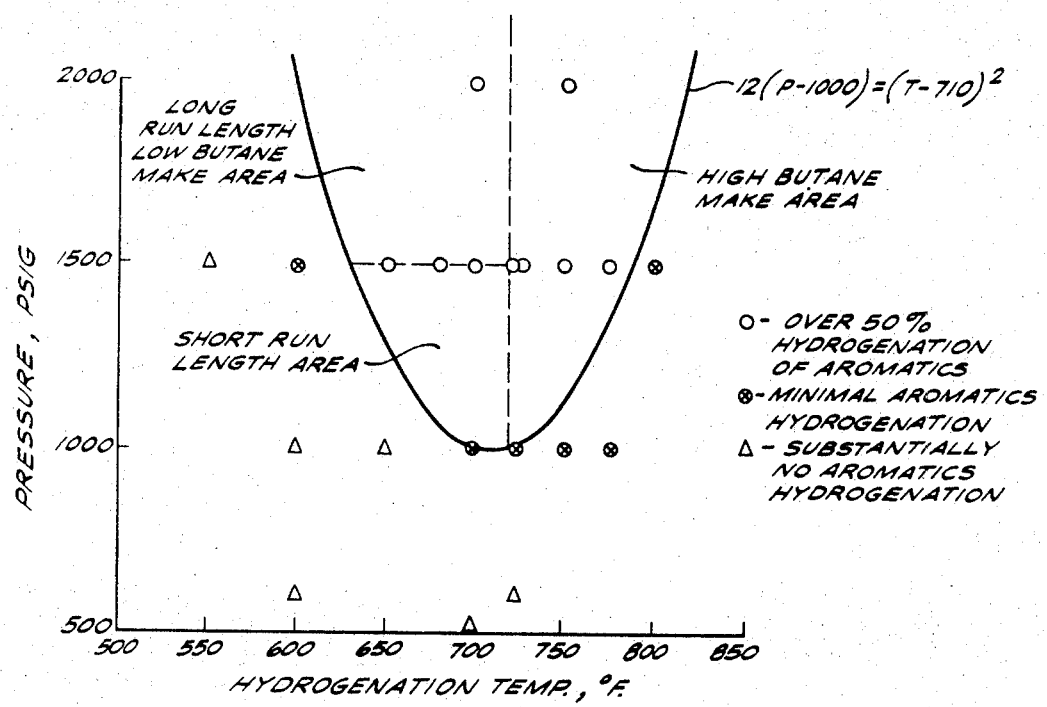
FIG. 2 shows that even though sufficient denitrogenation has taken place to permit mono-aromatics hydrogenation to occur, it is additionally necessary to maintain the proper pressure-temperature conditions for the desired result. The data points plotted in FIG. 2 represent pressure-temperature conditions which, in the examples herein, did reduce the feed nitrogen content to below 5 p.p.m., but did not in all cases give the desired aromatics hydrogenation. The plotted points are divided arbitrarily into three classes, i.e., those which gave over 50% hydrogenation of aromatics to completely non-aromatic species, those which gave the only minimal such hydrogenation, and those which gave substantially no such hydrogenation. It will be noted firstly that pressures of 1000 p.s.i.g. and below are at best minimally adequate. Further, the temperature-pressure combinations which gave the best results fall approximately within the parabola defined by the equation.

A further objective of the process is to minimize the production of dry gases and butanes. For this purpose it is preferred to operate the process at below about 720° F., as illustrated in FIG. 2. This further emphasizes the desirability of operating at above 1500 p.s.i.g. if adequate run lengths are desired with end-of-run temperatures of 700–720° F.

The following examples are cited to illustrate the invention more specifically, but are not to be construed as limiting in scope.

EXAMPLE 1

Two extended denitrogenation-hydrogenation runs were carried out at 1.0 space velocity and 7500 s.c.f. of hydrogen per barrel of feed, using various combinations of temperature and pressure. The feedstock was a blend of coker gas oils analyzing as follows:

Feed analysis

| | |
|---|---|
| Gravity, ° API | 33.3 |
| Boiling Range, ° F. (A.S.T.M.) | |
| Initial | 356 |
| 10% | 406 |
| 50% | 456 |
| 90% | 504 |
| Maximum | 538 |
| Sulfur, wt. percent | 2.76 |
| Nitrogen, p.p.m. | 1270 |
| Cetane index | 36.7 |
| Aromatic hydrocarbons, vol. percent | 23 |
| Monoaromatics, wt. percent | 16.5 |
| Diaromatics, wt. percent | 6.9 |

The catalyst was a presulfided composite of 3.1 weight-percent nickel oxide and 14.7 weight-percent MoO$_3$ supported on a coprecipitated alumina-silica cogel containing 3.2 weight-percent SiO$_2$, in the form of 1/16" extruded pellets. The principal conditions and results of the runs were as follows:

TABLE 1.—RESULTS OF FIRST 676-HOUR RUN

| | | Butane yield, vol. percent | Turbine fuel product, 295° F.+ TBP [1] | | | |
|---|---|---|---|---|---|---|
| Pressure/temperature | Median catalyst age, hrs. | | Yield, vol. percent | Aromatics, vol. percent | Nitrogen, p.p.m. | Cetane index |
| 500 p.s.i.g. at temp., ° F.: | | | | | | |
| 700 | 228 | | | 23 | 1.0 | 47.7 |
| 1,000 p.s.i.g. at temp., ° F.: | | | | | | |
| 600 | 260 | 0.1 | 97.9 | 21 | 64 | 48.2 |
| 650 | 324 | 0.1 | 99.4 | 19 | 3.0 | 47.5 |
| 700 | 92 | 0.4 | 97.1 | 12 | 1.0 | 50.0 |
| 1,500 p.s.i.g. at temp., ° F.: | | | | | | |
| 700 | 60 | 0.4 | 96.9 | 8 | 0.6 | 50.5 |
| 725 | 516 | 0.6 | 97.0 | 10 | 1.0 | 51.8 |
| 750 | 576 | 0.8 | 94.6 | 9 | 1.0 | 51.3 |
| 775 | 608 | 1.1 | 91.4 | 10 | 1.0 | 51.5 |
| 800 | 640 | 1.6 | 88.1 | 18 | 1.0 | 51.2 |
| 700 | 672 | 0.3 | 97.8 | 15 | 1.0 | 52.0 |
| 2,000 p.s.i.g. at temp., ° F.: | | | | | | |
| 700 | 28 | 0.3 | 98.2 | 5 | 1.0 | 50.7 |

[1] True boiling point distillation.

TABLE 2.—RESULTS OF SECOND 724-HOUR RUN

| | | Butane yield, vol. percent | Turbine fuel product, 295° F.+ TBP | | | |
|---|---|---|---|---|---|---|
| Pressure/temperature | Median catalyst age, hrs. | | Yield, vol. percent | Aromatics, vol. percent | Nitrogen, p.p.m. | Cetane index |
| 1,000 p.s.i.g. at temp., ° F.: | | | | | | |
| 600 | 308 | 0.1 | 98.3 | 21 | 95 | 47.7 |
| 700 | 452 | 0.2 | 98.0 | 14 | 2.0 | 49.7 |
| 725 | 632 | 0.6 | 95.7 | 13 | 1.0 | 50.0 |
| 750 | 664 | 1.0 | 93.8 | 15 | 1.0 | 49.5 |
| 775 | 696 | 0.8 | 86.8 | 13 | 1.0 | 48.8 |
| 600 | 720 | 0.1 | 97.1 | 23 | 132 | 47.5 |
| 1,500 p.s.i.g. at temp., ° F.: | | | | | | |
| 550 | 124 | 0.0 | 96.0 | 24 | 600 | 46.7 |
| 580 | 118 | 0.3 | 96.8 | 20 | 135 | 48.3 |
| 580 | 236 | 0.0 | 98.2 | 21 | 167 | 48.2 |
| 580 | 276 | 0.2 | 98.2 | 21 | 173 | 47.8 |
| 650 | 28 | 0.2 | 99.7 | 12 | 1.0 | 50.8 |
| 680 | 60 | 0.1 | 96.9 | 9 | 0.9 | 50.7 |
| 720 | 92 | 0.3 | 97.5 | 6 | 1.0 | 51.3 |

The salient point to note from the foregoing data is that substantial aromatics hydrogenation occurred only (1) in those cases where the product nitrogen content was below 5 p.p.m., and (2) at pressure-temperature combinations falling within or close to the parabola depicted in FIG. 2. It will be noted also that the butane yields increased significantly at all temperatures above 720° F.

EXAMPLE II

Using the same catalyst employed in Example I, and under the same conditions except where otherwise stated, another extended denitrogenation-hydrogenation run was carried out using as the feed a turbine stock derived from a hydrofined blend of catalytic cycle oils and straight run gas oils, the turbine fuel analyzing as follows:

Feed analysis

| | |
|---|---|
| Gravity, ° API | 40.5 |
| Boiling Range, ° F.(A.S.T.M.): | |
| Initial | 351 |
| 10% | 378 |
| 50% | 417 |
| 90% | 461 |
| Maximum | 510 |
| Sulfur, p.p.m. | 279 |
| Nitrogen, p.p.m. | 110 |
| Cetane index | 43.8 |
| Aromatic hydrocarbons, vol. percent | 25 |

The principal conditions and results of the run were as follows:

TABLE 3

| Pressure/temperature | Median catalyst age, hrs. | Butane yield, vol. percent | Turbine fuel product, 295° F.+ TBP | | | |
|---|---|---|---|---|---|---|
| | | | Yield, vol. percent | Aromatics, vol. percent | Nitrogen, p.p.m. | Cetane index |
| 600 p.s.i.g. at temp., ° F.: | | | | | | |
| 600 | 822 | 0.1 | 101.3 | 22 | 1.0 | 46.0 |
| 725 | 878 | 0.2 | 98.0 | 23 | 1.0 | 44.4 |
| 1,000 p.s.i.g. at temp., ° F., 725 | 910 | 0.1 | 97.7 | 17 | 0.4 | 47.0 |
| 1,500 p.s.i.g. at temp., ° F.: | | | | | | |
| 600 | 854 | 0.0 | 100.1 | 15 | 0.8 | 46.9 |
| 725 | 886 | 0.2 | 99.8 | 11 | 0.4 | 48.9 |

The foregoing confirms and corroborates the conclusions reached from the data in Example I.

EXAMPLE III

Using the same feed as in Example I, and at the same contacting conditions except where otherwise stated, another extended denitrogenation-hydrogenation run was carried out using as the catalyst a presulfided nickel-tungsten catalyst composed of 7.2 weight-percent NiO and 11.1 weight-percent WO₃ supported on a carrier consisting essentially of activated alumina in the form of a ⅛-inch extrudate. The principal conditions and results of the run were as follows:

TABLE 4

| Pressure/ temperature | Median catalyst age, hrs. | Butane yield, vol. percent | Turbine fuel product, 295° F.+ TBP | | |
|---|---|---|---|---|---|
| | | | Yield, vol. percent | Aromatics, vol. percent | Nitrogen, p.p.m. |
| 2,000 p.s.i.g. at temp., ° F.: | | | | | |
| 600 | 132 | 0.0 | 98.0 | 20 | 424 |
| 650 | 164 | 0.0 | 97.8 | 18 | 19.0 |
| 700 | 196 | 0.3 | 97.5 | 10 | 1.0 |
| 725 | 60 | 0.5 | 95.5 | 7 | 1.0 |
| 750 | 100 | 1.8 | 90.7 | 5 | 0.3 |

The foregoing demonstrates that nickel-tungsten catalysts behave in essentially the same manner as nickel-molybdenum catalysts for the present purposes.

The foregoing details as to catalysts and process conditions are not intended to be limited in effect. The following claims and their reasonable equivalents are intended to define the true scope of the invention.

We claim:

1. A method for the hydrogenation of aromatic hydrocarbons in mineral oil feedstocks boiling in the range of about 300–750° F. and containing at least about 100 p.p.m. of organic nitrogen and at least about 0.01 weight-percent of sulfur, which comprises subjecting such feedstock plus added hydrogen to catalytic hydrofining at a temperature between about 550° and 850° F. in contact with a catalyst consisting essentially of a minor proportion of nickel sulfide plus a minor proportion of a sulfide of molybdenum and/or tungsten supported on a predominantly alumina carrier having a cracking activity index below about 25, the severity of said hydrofining being sufficient to reduce the organic nitrogen content of said feedstock to below about 20 p.p.m., then subjecting total effluent from said hydrofining, without intervening separation of ammonia and hydrogen sulfide, to catalytic hydrogenation at a pressure-temperature combination falling within the parabola defined by the equation $$12(P-1000) = (T-710)^2$$

where P is pressure in p.s.i.g. and T is temperature in ° F., in contact with a catalyst as defined above for said hydrofining step, to effect a substantial saturation of aromatic hydrocarbons, and recovering a product containing less than about 5 p.p.m. of organic nitrogen and having a substantially lower aromaticity than said feedstock.

2. A method as defined in claim 1 wherein said hydrogenation of aromatic hydrocarbons is carried out at a pressure above about 1500 p.s.i.g. and a temperature below about 720° F.

3. A method as defined in claim 2 wherein said denitrogenation and hydrogenation of aromatic hydrocarbons is continued integrally for a run length of at least about 30 days while periodically increasing the respective temperatures a total of at least about 40° F. within the range of 625° to 720° F.

4. A method as defined in claim 1 wherein the catalyst employed for said denitrogenation and hydrogenation of aromatic hydrocarbons is essentially a sulfided composite of nickel and molybdenum supported on activated alumina.

5. A process as defined in claim 1 wherein said denitrogenation is carried out adiabatically without quenching, and wherein said hydrogenation of aromatic hydrocarbons is carried out with the injection of cool quench gas to effect temperature reduction in at least one intermediate zone thereof.

6. A method as defined in claim 1 wherein said feedstock contains at least about 10 weight-percent of aromatic hydrocarbons, and wherein at least about 20 mole-percent of said aromatic hydrocarbons are hydrogenated to completely non-aromatic hydrocarbons.

7. A method as defined in claim 1 wherein said hydrogenation of aromatic hydrocarbons is carried out at a pressure between about 1,000 and 2,000 p.s.i.g.

8. A method as defined in claim 1 wherein said hydrogenation of aromatic hydrocarbons is carried out at a temperature below about 720° F. and at a pressure between about 1,500 and 2,000 p.s.i.g.

9. A method as defined in claim 1 wherein said catalytic hydrofining and catalytic hydrogenation steps are carried out at a combined space velocity between about 0.75 and 5.0, with hydrogenation temperature and pressure correlated to give at least about a 30 mole-percent conversion of the aromatic hydrocarbons in said feedstock to completely nonaromatic species.

10. An integral process for denitrogenating and hydrogenating aromatic hydrocarbons in a mineral oil feedstock boiling mainly within the range of about 300° F. to 750° F., and containing monoaromatic hydrocarbons, organic sulfur in amounts greater than about 0.01 weight-percent and at least about 100 p.p.m. of organic nitrogen, which comprises contacting said feedstock plus added hydrogen with a denitrogenation-hydrogenation catalyst consisting essentially of a minor proportion of nickel sulfide plus a minor proportion of a sulfide of molybdenum and/or tungsten supported on a predominantly alumina carrier having a cracking activity index below about 25, and maintaining in said contacting zone a pressure between about 1500 and 4000 p.s.i.g. and an average bed temperature between about 625° and 720° F. and a space velocity between about 0.75 and 5.0, said temperature being periodically adjusted upwardly over a run length of at least about 30 days to maintain a product effluent of substantially reduced monoaromatic hydrocarbon content containing less than about 5 p.p.m. of organic nitrogen and with a minimum production of butane.

11. A method as defined in claim 10 wherein the catalyst employed for said denitrogenation and hydrogenation of aromatic hydrocarbons is essentially a sulfided composite of nickel and molybdenum supported on activated alumina.

12. A method as defined in claim 10 wherein said feedstock contains at least about 10 weight-percent of aromatic hydrocarbons, and wherein at least about 20 mole-percent of said aromatic hydrocarbons are hydrogenated to completely non-aromatic hydrocarbons.

References Cited
UNITED STATES PATENTS

| | | | |
|---|---|---|---|
| 3,189,540 | 6/1965 | Kozlowski et al. | 208—89 |
| 3,594,307 | 7/1971 | Kirk, Jr. | 208—89 |
| 3,227,646 | 1/1966 | Jacobson et al. | 208—89 |
| 3,516,926 | 6/1970 | Davis, Jr. et al. | 208—143 |

DELBERT E. GANTZ, Primary Examiner

G. J. CRASANAKIS, Assistant Examiner

U.S. Cl. X.R.

260—667